Patented Oct. 18, 1949

2,485,535

UNITED STATES PATENT OFFICE 2,485,535

CERIC SULFATE CATALYZED EMULSION POLYMERIZATION OF STYRENE

Harold F. Park, East Longmeadow, Mass., assignor to Monsanto Chemical Company, St. Louis, Mo., a corporation of Delaware No Drawing. Application December 12, 1946, Serial No. 715,647

2 Claims. (Cl. 260—93.5)

This invention relates to polystyrene. More particularly, the invention relates to the polymerization of styrene in aqueous emulsion and to a new catalyst therefor.

The polymerization of styrene in aqueous emulsion provides a means for the rapid production of polystyrene under conditions more easily controllable than in the mass polymerization of styrene. Heretofore, the polymerization catalysts used have been peroxides and per salts which tend to decompose during the polymerization process to yield acidic products which may be harmful to the polymerized styrene. The harmful decomposition products may be eliminated from an emulsion polymer of styrene but only by expensive and time-consuming processes including coagulation of the emulsion, washing and drying the coagulated material.

It is an object of this invention to provide a new catalyst for the polymerization of styrene in aqueous emulsion.

A further object is to provide a process for producing polystyrene in aqueous emulsion.

These and other objects are obtained by using ceric sulfate as a catalyst in the polymerization of styrene in aqueous emulsion.

The following examples are given in illustration and are not intended as limitations on the scope of this invention. Where parts are mentioned, they are parts by weight.

Example I

Three solutions were prepared:

| A | Parts |
|---|---|
| Styrene monomer | 100 |
| Dodecyl mercaptan | 0.25 |

| B | |
|---|---|
| Water | 200 |
| Sodium stearate | 0.20 |
| Sodium hydroxide | 0.043 |

| C | |
|---|---|
| Water | 15 |
| Ceric sulfate | .10 |

Solution B was refluxed at atmospheric pressure for about 10 minutes. About ⅕ of the solution C was then added to solution B. Solution A was added to the reaction mixture gradually over a period of about 1 hour, during which time successive portions of solution C were added about every 15 minutes. The emulsion produced was further refluxed at atmospheric pressure for an additional 30 minutes. During the addition of the component solutions and during the final refluxing period, the reactants were continually agitated with the agitation being carefully controlled to prevent surface turbulence. In addition, a blanket of carbon dioxide was maintained over the reactants by continually bleeding carbon dioxide into the reaction chamber. The pH of the solution and the emulsion was approximately 10—11 throughout the polymerization cycle. The resulting emulsion was dried directly by drum drying. The product was a fine grained polymer having a molecular weight of about 70,000 and containing less than 0.5% of methanol solubles.

If desired, the emulsion, instead of being dried directly, may be coagulated by any of the well-known means, washed and then dried. However, it has been found that the properties of the direct dried polymer are not detrimentally affected by the extremely small amounts of emulsifier, modifier and catalyst used in the formulation and retained in the polymer.

Example II

Portion A:

| | Parts |
|---|---|
| Styrene monomer | 100 |
| Dodecyl mercaptan | 0.25 |
| Acto 450 (sodium salt of mahogany acids) | 0.20 |

Portion B:

| | |
|---|---|
| Water | 200 |
| Acto 450 | 0.20 |

Portion C:

| | |
|---|---|
| Water | 15 |
| Ceric sulfate | 0.10 |

Substantially the same procedure was used as shown in Example I except that the pH was 7 or slightly less throughout the polymerization cycle. The emulsion produced was direct dried, i. e., without coagulation to yield an easily moldable polymer having excellent resistance to weathering and heat distortion.

Example III 100 parts of styrene monomer were added slowly over a period of about 1 hour to a hot solution of 5 parts of sodium dodecyl benzene sulfonate and 1 part of ceric sulfate in 500 parts of water. The temperature of the solution was maintained at about 90° C.–95° C. during the addition of the styrene monomer and for about 15 minutes longer. A stable emulsion of polymerized styrene was obtained from which the polymer was isolated by coagulation with 10% aqueous sodium chloride solution. The polymer was washed and dried and then compression molded into a thin disc. The disc was transparent and clear and had excellent strength and electrical properties.

The dodecyl mercaptan shown in Examples I and II is a modifying agent for polystyrene. It may be incorporated wholly in the monomer solution, wholly in the water solution, or it may be divided between the two solutions, or it may be added continuously, or stepwise to the water solution. Other mercaptans and similar sulfur derivatives may be used as modifiers. The amount of modifier used depends on the molding properties desired in the polymerized styrene. In general, from about 0.025 to about 0.35 part per 100 parts of styrene monomer are sufficient to improve moldability of the polystyrene without adversely affecting the physical properties. However, as shown in Example III, it is not absolutely necessary to use such a modifier, since a moldable polymer may be obtained without it.

Different types of emulsifying agents were shown in the examples. Sodium stearate is an example of a soap-type emulsifier. Other soaps such as sodium oleate may be used. The pH of the reactants is kept well on the alkaline side if these emulsifiers are used, i. e., 7.5 to 12. A different type of emulsifying agent, i. e., sodium salts of strong organic sulfonic acids typified by Acto 450 or sodium dodecyl benzene sulfonate may also be used. The pH of the reaction medium is kept at 7 or below if such emulsifiers are used.

To obtain a polystyrene emulsion which may be direct dried to obtain a stable polymer having the desired physical properties, the amount of emulsifier used must be kept within the range of about 0.1 to about 0.5 part per 100 parts of styrene monomer. However, much larger amounts of emulsifying agents may be used which must subsequently be removed from the polystyrene by coagulation of the resin and washing of the coagulated resin.

It will be noted that no pH regulator is shown in Examples II and III. With ceric sulfate as catalyst, and the substantial elimination of oxygen by preboiling the water and maintaining an atmosphere of carbon dioxide over the reactants, it is unnecessary to regulate the pH of the reaction since no decomposition occurs to change the pH of the reaction. However, if it is difficult to eliminate oxygen, a pH regulator may be used to maintain the desired pH, e. g., sodium bicarbonate for a pH of 4.5 to 7, sodium hydroxide for a pH of 7.5 to 12. Furthermore, various pH regulators or buffers such as sodium acetate, sodium citrate, potassium formate, etc., may be employed if desired.

In the examples, the emulsion polymerization was carried out at reflux temperature (about 90 to about 100° C.) at atmospheric pressure. Such conditions are preferred. However, the temperature of the reaction may be as low as 60° C. with a corresponding increase in the time necessary to complete the polymerization after all ingredients have been added, i. e., from about ½ hour at reflux temperature to about 5 hours at 60° C.

Ceric sulfate has catalytic properties equal to or better than those of known catalysts such as peroxides and per salts and has the added and important advantage that it does not decompose to products harmful to the polymerized resin. This property allows the elimination of a pH regulator from the emulsions. Furthermore, the amount of ceric sulfate used may be restricted to the range of about 0.01 to about 0.4 part per 100 parts of styrene. The combination of stability and small proportion is exceedingly valuable since it permits direct drying of the emulsions to yield stable polymers. Other catalysts which decompose and are used in larger quantities, must be washed from the polystyrene in order to render the polystyrene stable. Larger amounts of ceric sulfate may be used, as shown in Example III and it is then necessary to coagulate the emulsion and wash out the excess catalyst to obtain a stable polymer.

Polymers of styrene made according to this invention are more stable and more easily moldable than previously prepared aqueous emulsion polymers of styrene. They contain very small amounts of the impurities known as "methanol solubles," generally less than 0.5% and have physical properties similar to or better than mass polymers produced for molding purposes. The table compares the properties of an emulsion polymer made by the process of Example II of this invention with a mass polymer made for molding purposes by a standard commercial method.

Table

|  | Mass Polymer | Emulsion Polymer |
|---|---|---|
| Molecular weight | ca. 70,000 | ca. 70,000 |
| Flexural strength, p. s. i | ca. 11,000 | 13,800 |
| Deflection, inches of gauge | 0.130 | 0.240 |
| Impact strength—V-notched bar, ft.lbs./in. bar | 1.3 | 1.6 |
| Heat distortion, ° C | 78 | 90 |
| Methanol solubles, per cent | 3.5 | 0.3 |

Many variations in the processes and products of this invention may be made without departing from the spirit and scope thereof as defined in the appended claims.

What is claimed is:

1. A process which comprises polymerizing monomeric styrene in aqueous emulsion at a temperature of from 60° C. to 100° C. in contact with from 0.01 to 0.4 part of ceric sulfate per 100 parts of styrene monomer, said ceric sulfate being the sole polymerization catalyst.

2. A process which comprises polymerizing monomeric styrene in aqueous emulsion in the substantial absence of oxygen at a temperature of from 60° C. to 100° C. with from 0.01 to 0.4 part of ceric sulfate per 100 parts of styrene monomer, said ceric sulfate being the sole polymerization catalyst.

HAROLD F. PARK.

REFERENCES CITED

The following references are of record in the file of this patent:

FOREIGN PATENTS

| Number | Country | Date |
|---|---|---|
| 440,173 | France | July 3, 1912 |

OTHER REFERENCES

Kolthoff et al., Jour. Am. Chem. Soc., 67, pp. 1672–74 (1945).